United States Patent
Inoue et al.

(10) Patent No.: US 7,482,914 B2
(45) Date of Patent: Jan. 27, 2009

(54) OPERATION INFORMATION DISPLAY FOR INDUSTRIAL VEHICLE

(75) Inventors: Kiyoshi Inoue, Machida (JP); Takayuki Kishimoto, Iruma (JP); Makoto Wagatsuma, Tachikawa (JP); Toru Takamura, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 202 days.

(21) Appl. No.: 11/396,547

(22) Filed: Apr. 4, 2006

(65) Prior Publication Data

US 2006/0238325 A1  Oct. 26, 2006

(30) Foreign Application Priority Data

Apr. 21, 2005  (JP)  ............... 2005-123679

(51) Int. Cl.
*B60Q 1/00* (2006.01)
(52) U.S. Cl. .................. 340/461; 340/691.6; 340/438; 700/108
(58) Field of Classification Search .................. 340/461
See application file for complete search history.

(56) References Cited

U.S. PATENT DOCUMENTS

| | | | | |
|---|---|---|---|---|
| 4,988,996 A | * | 1/1991 | Ito | 340/984 |
| 5,065,320 A | * | 11/1991 | Hayashi et al. | 701/1 |
| 5,131,801 A | * | 7/1992 | Melanson | 414/635 |
| 5,483,446 A | * | 1/1996 | Momose et al. | 701/1 |
| 5,764,139 A | * | 6/1998 | Nojima et al. | 340/461 |
| 6,266,594 B1 | * | 7/2001 | Ishikawa | 340/438 |
| 6,320,497 B1 | * | 11/2001 | Fukumoto et al. | 340/425.5 |
| 6,397,133 B1 | * | 5/2002 | van der Pol et al. | 340/438 |
| 6,411,867 B1 | * | 6/2002 | Sakiyama et al. | 340/937 |
| 6,774,773 B2 | * | 8/2004 | Funayose et al. | 340/441 |
| 7,019,624 B2 | * | 3/2006 | Kawashima et al. | 340/425.5 |
| 7,143,363 B1 | * | 11/2006 | Gaynor et al. | 340/461 |
| 2004/0249538 A1 | * | 12/2004 | Osaki et al. | 701/50 |
| 2005/0288833 A1 | * | 12/2005 | Motose | 701/21 |
| 2007/0182537 A1 | * | 8/2007 | Abe et al. | 340/462 |

FOREIGN PATENT DOCUMENTS

| | | |
|---|---|---|
| DE | 10 2004 013 609 A1 | 10/2005 |
| GB | 2 360 500 A | 6/2001 |
| JP | 63-111419 A | 5/1988 |
| JP | 63111419 A * | 5/1988 |
| JP | 11-106200 A | 4/1999 |
| JP | 11322294 A * | 11/1999 |
| JP | 2004-075216 A | 3/2004 |

* cited by examiner

*Primary Examiner*—George A Bugg
*Assistant Examiner*—Eric M Blount
(74) *Attorney, Agent, or Firm*—Foley & Lardner LLP

(57) ABSTRACT

A steering angle of steered wheels and a vehicle speed of a fork-lift truck are respectively detected by sensors (4, 5). A CPU (1) compares the vehicle speed with a predetermined speed (S2), and causes a meter (6) to display the steering angle when the vehicle speed is lower than the predetermined speed (S4, S14), and causes the meter (6) to display the vehicle speed when the vehicle speed not lower than the predetermined speed (S3, S13). As a result, the space for the display device can be reduced without affecting the operation efficiency of the fork-lift truck.

8 Claims, 5 Drawing Sheets

OPERATION INFORMATION DISPLAY FOR INDUSTRIAL VEHICLE

FIELD OF THE INVENTION

This invention relates to the display of the vehicle speed and steering angle of the steered wheels of an industrial vehicle such as a fork-lift truck.

BACKGROUND OF THE INVENTION

JP2004-075216A published in 2004 and JPH11-106200A published in 1999, respectively by the Japan Patent Office disclose a display panel of operation information for an industrial vehicle, such as a folk-lift truck. The operation information includes a vehicle speed and a steering angle of the steered wheels.

SUMMARY OF THE INVENTION

In view of the operation efficiency of the vehicle, it is desirable that the vehicle is provided with the same number of display devices as the number of information types.

As a result, however, a number of meters are required and the display panel which incorporates these meters inevitably becomes large.

It is therefore an object of this invention to decrease the area of the display panel without reducing the operation efficiency of an industrial vehicle.

In order to achieve the above object, this invention provides a vehicle information display device for use with an industrial vehicle having a steered wheel. The device comprises a vehicle speed sensor which detects a vehicle speed, a steering angle sensor which detects a steering angle of the steered wheel, a meter which can selectively display the vehicle speed and the steering angle of the steered wheel, and a programmable controller programmed to switch a display on the meter between the vehicle speed and the steering angle of the steered wheel in accordance with the vehicle speed.

This invention also provides a vehicle information display method for an industrial vehicle having a steered wheel and a meter which can selectively display a vehicle speed and a steering angle of the steered wheel. The method comprises detecting the vehicle speed, detecting the steering angle of the steered wheel, and switching a display on the meter between the vehicle speed and the steering angle of the steered wheel in accordance with the vehicle speed.

The details as well as other features and advantages of this invention are set forth in the remainder of the specification and are shown in the accompanying drawings.

DESCRIPTION OF THE PREFERRED EMBODIMENTS

Figure 1:
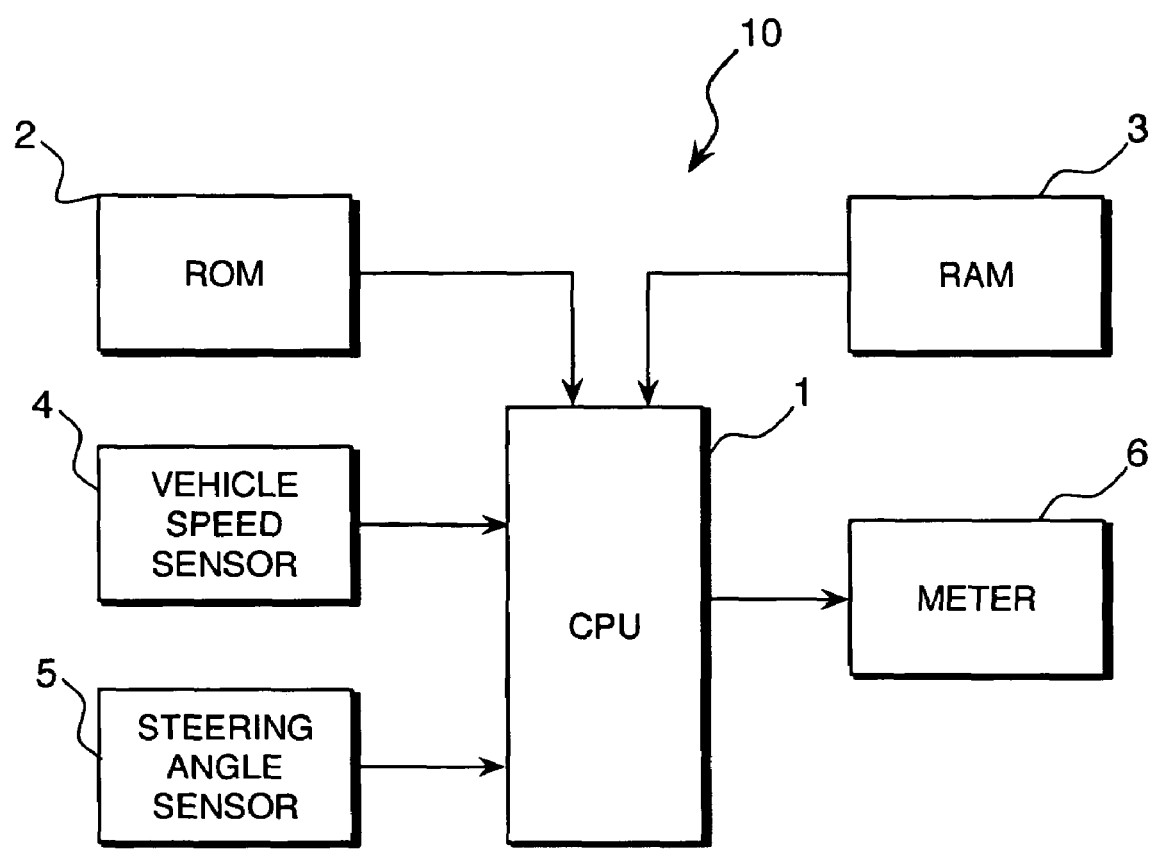
FIG. 1 is a block diagram of a display device according to this invention.

Referring to FIG. 1 of the drawings, a vehicle speed/steering angle display device 10 mounted on a fork-lift truck comprises a Central Processing Unit (CPU) 1, a Read Only Memory (ROM) 2, a Random Access Memory (RAM) 3, a vehicle speed sensor 4, a steering angle sensor 5 and meter 6 which are respectively connected to the CPU 1.

The ROM 2 stores a program which is performed by the CPU 1 and a reference vehicle speed which is previously determined. The reference vehicle speed will be described later.

The RAM 3 temporarily stores the reference vehicle speed read from the ROM 2 by the CPU 1 and data input from the vehicle speed sensor 4 and steering angle sensor 5.

In the claims, the CPU 1, ROM 2 and RAM 3 are named generically as a programmable controller.

The vehicle speed sensor 4 detects a running speed of the fork-lift truck, i.e., a vehicle speed, and outputs a corresponding signal to the CPU 1.

The steering angle sensor 5 detects a steering angle of the steered wheels of the fork-lift truck and outputs a corresponding signal to the CPU 1. Herein, the steered wheels are the wheels which vary their direction in response to a steering operation conducted by an operator of the fork-lift truck. The steering angle denotes an angle of the steered wheels with respect to the direction thereof when they are rolling straight ahead.

The meter 6 may be of an analog type or a digital type as long as it can selectively indicate the vehicle speed and steering angle of the steered wheels. The meter 6 cannot indicate the vehicle speed and steering angle together at the same time, but can indicate the vehicle speed or the steering angle one at a time as required.

Figure 2:
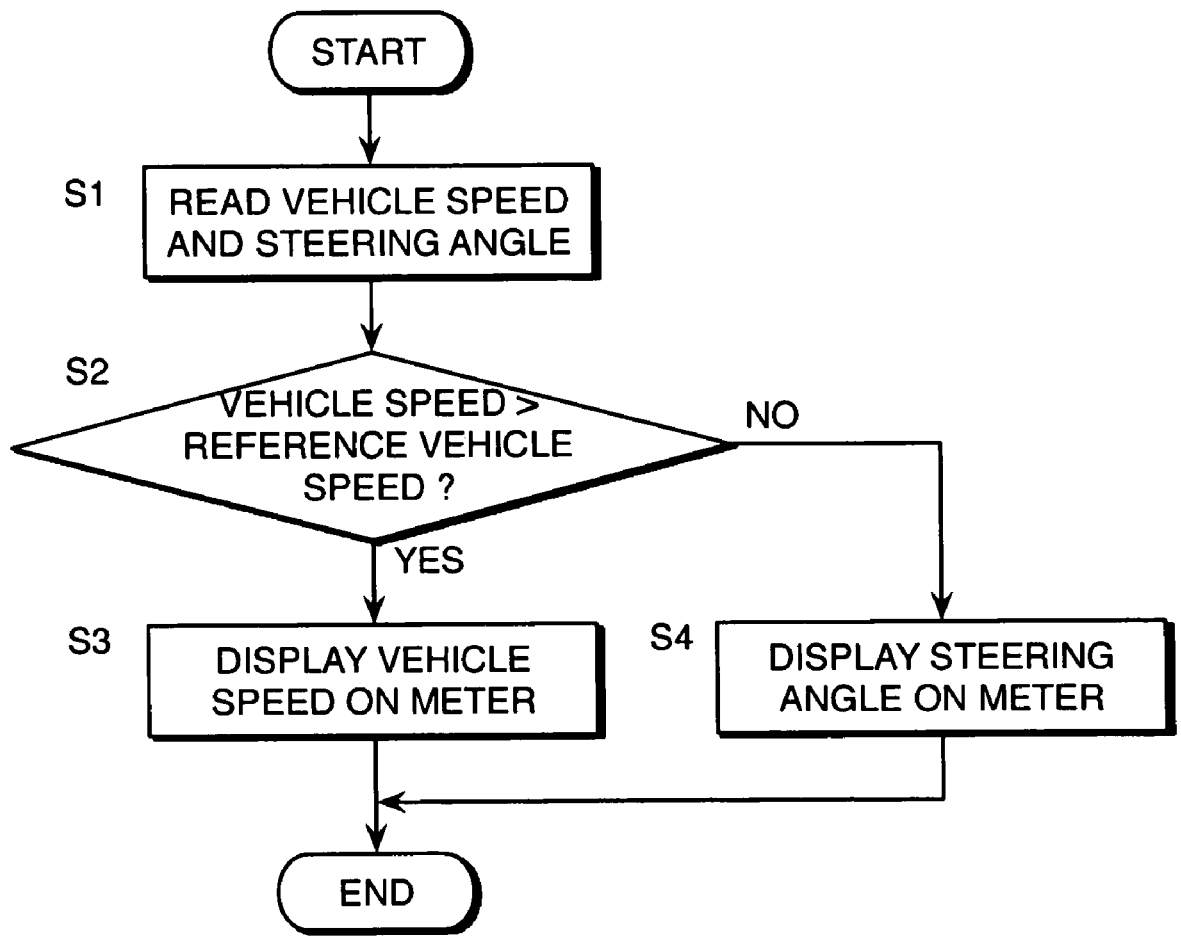
FIG. 2 is a flowchart describing a display switching routine performed by a Central Processing Unit (CPU) according to this invention.

The CPU 1 performs a display switching routine which is shown in FIG. 2 based on the input signals from the vehicle speed sensor 4 and steering angle sensor 5. The CPU 1 performs this routine at intervals of, for example, ten milliseconds while a main switch of the fork-lift truck is turned on.

Referring to FIG. 2, in a step S1, the CPU 1 respectively reads the vehicle speed detected by the vehicle speed sensor 4 and the steering angle detected by the steering angle sensor 5, and stores these data in the RAM 3.

In a step S2, the CPU 1 compares the vehicle speed stored in the RAM 3 with the reference vehicle speed stored in the ROM 2. The reference vehicle speed is a vehicle speed for determining which one of the vehicle speed and steering angle should be displayed on the meter 6. When the vehicle speed is lower than the reference vehicle speed, the CPU 1 causes the meter 6 to display the steering angle of the steered wheels, and when the vehicle speed is equal to or higher than the reference vehicle speed, it causes the meter 6 to display the vehicle speed. Herein, the reference vehicle speed is set equal to three kilometers per hour. However, any other value such as seventeen or eighteen kilometers per hour, may be applied as the reference vehicle speed in accordance with the specification or characteristic of the vehicle.

Figure 3A:
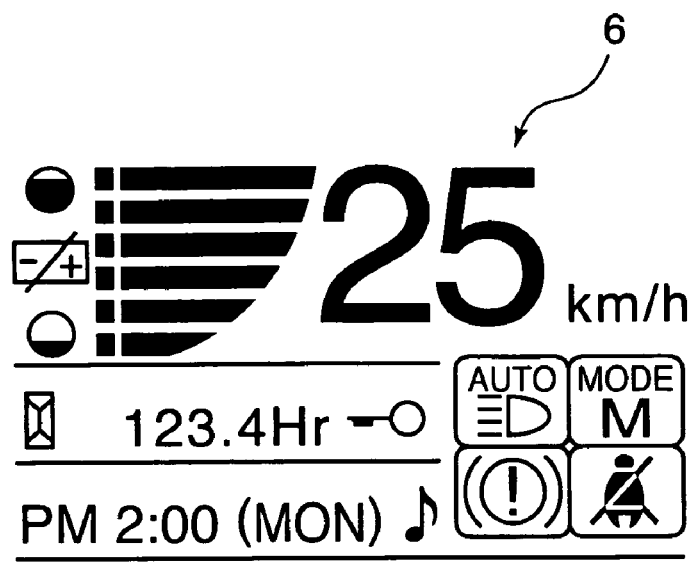
FIGS. 3A and 3B are front views of a meter according to this invention mounted on a fork-lift truck.

When the vehicle speed is equal to or higher than the reference vehicle speed in the step S2, the CPU 1 causes the meter 6 in a step S3 to display the vehicle speed as shown in FIG. 3A. After the processing of the step S3, the CPU 1 terminates the routine.

In contrast, when the vehicle speed is lower than the reference vehicle speed in the step S2, the CPU 1 causes the meter 6 in a step S4 to display the steering angle of the steered wheels as shown in FIG. 3A. Although the steering angle is indicated graphically in the figure, it may be indicated numerically. After the processing of the step S4, the CPU 1 terminates the routine.

The reasons for causing the meter 6 to display the steering angle when the vehicle speed is low, and causing the meter 6 to display the vehicle speed when the vehicle speed is high are described as follows.

Specifically, when the fork-lift truck runs at a speed corresponding to a low vehicle speed region which corresponds to, for example, a case where the fork-lift truck is about to stop just after starting or is switching between forward running and reverse running, it is necessary to monitor the steering angle of the steered wheels in order to predict which path the fork-lift truck and objects carried by the fork-lift truck will take. Further, the need for large-angle steering arises only in the low vehicle speed region.

However, it is possible that the operator cannot grasp the current steering angle by sight due to the steered wheels being covered by a large object carried by the fork-lift truck. In the case of a rear-wheel-steering type fork-lift truck, it is intrinsically impossible for the operator to keep the steered wheels in his/her sight. In the low vehicle speed region, therefore, it is indispensable to display the steering angle of the steered wheels on the meter 6, while on the other hand, monitoring of the vehicle speed is not required to much extent in the low vehicle speed region.

When the fork-lift truck is running in a higher speed region, it is necessary to monitor the vehicle speed in order to control the vehicle speed, while on the other hand monitoring of the steering angle is not required to much extent in the higher speed region, because the fork-lift performs stable running in this speed region.

Thus, the importance of monitoring the steering angle and the importance of monitoring the vehicle speed are reversed depending on the vehicle speed. By switching between display of the steering angle and display of the vehicle speed on the meter 6 in a timely fashion, the space for the display device can be minimized without affecting the operation efficiency of the fork-lift truck.

Next, referring to FIGS. 4 and 5, another embodiment of this invention will be described.

Figure 3B:
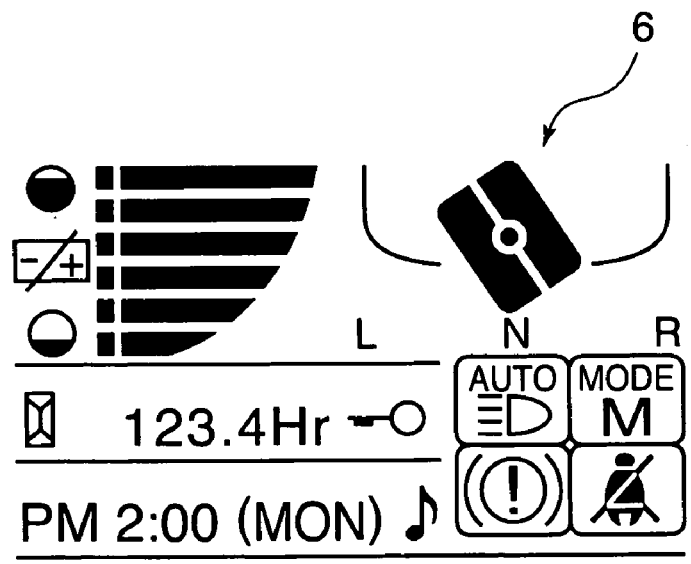

According to this embodiment, a display control unit 7 is interposed between the CPU 1 and the meter 6. Otherwise, the hardware construction is identical to that of the first embodiment. The display control unit 7 comprises a microcomputer provided with a CPU, a ROM and a RAM, and depending on the signals output from the CPU 1, switches the display mode of the meter 6 and indicates the designated data by the signals on the meter 6. The display control unit 7 controls not only display of the vehicle speed and the steering angle, but also display of other information such as the battery state of charge and operation mode of the fork-lift truck which are also shown in FIGS. 3A and 3B.

Figure 4:
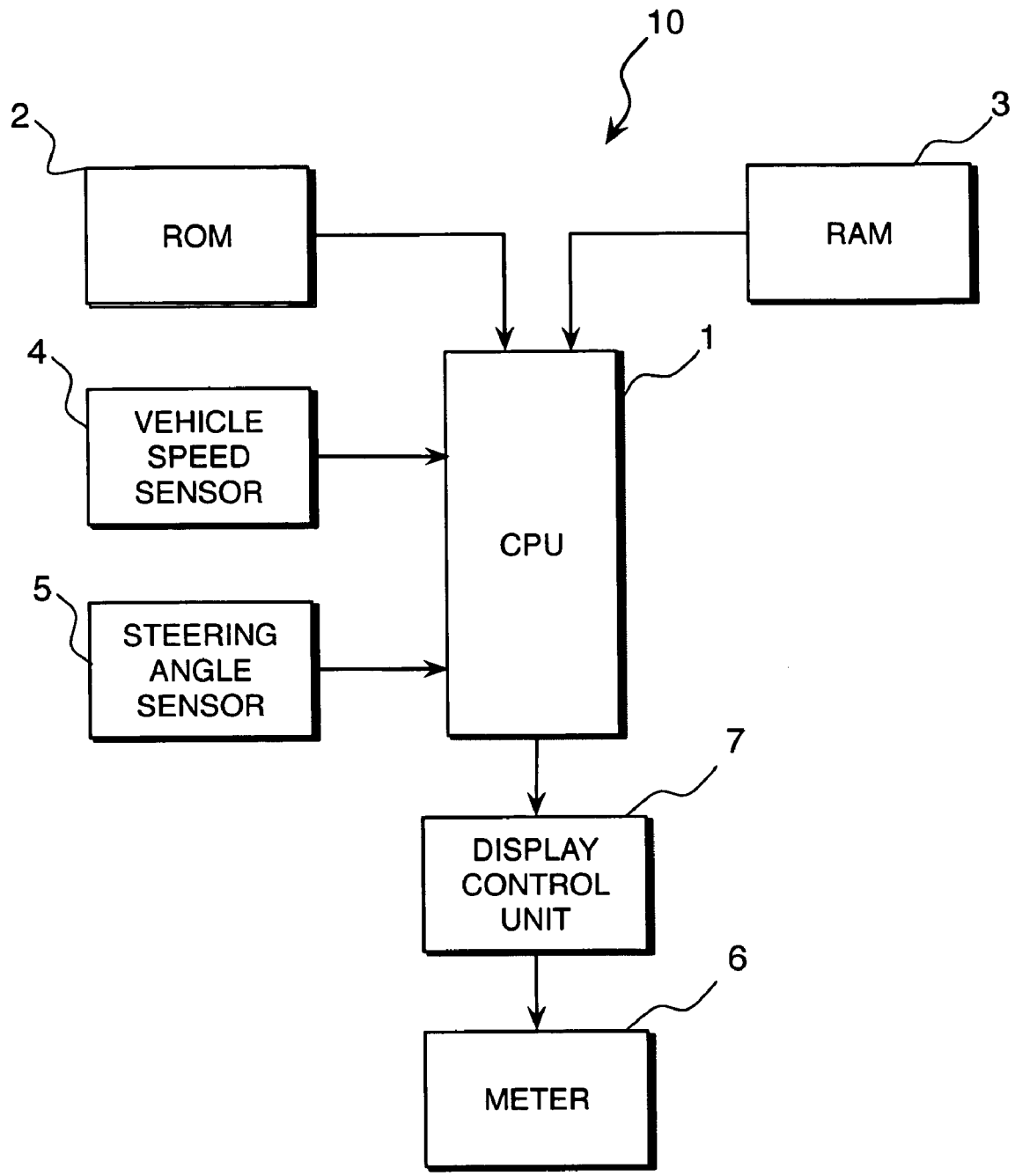
FIG. 4 is a block diagram of a display device according to another embodiment of this invention.
Figure 5:
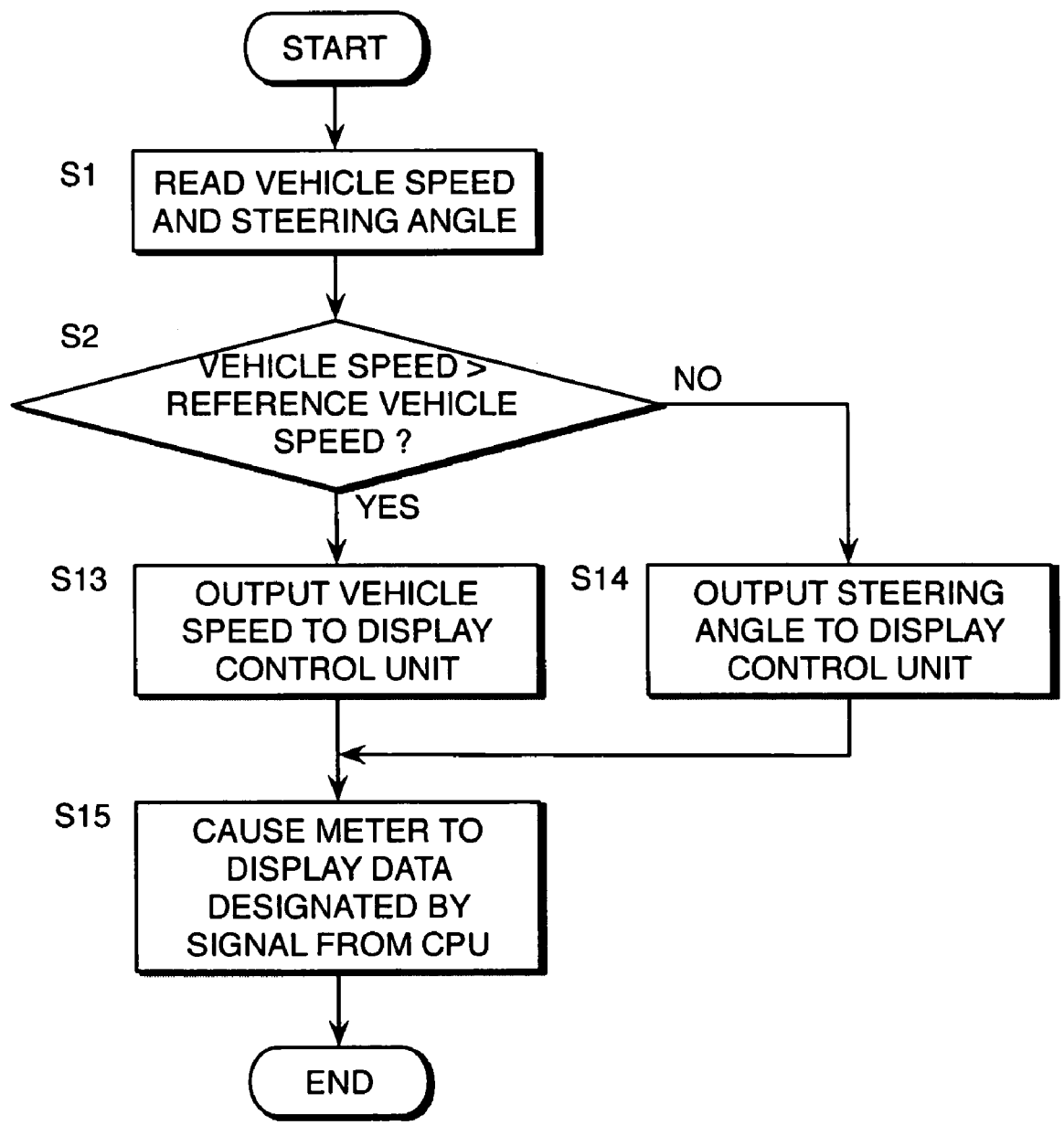
FIG. 5 is a flowchart describing a display switching routine performed by a CPU according to the other embodiment of this invention.

The CPU 1 performs a display switching routine of FIG. 4 instead of the display switching routine of FIG. 2. This routine is also performed at intervals of ten milliseconds while the main switch of the fork-lift truck is turned on, as in the case of the routine of FIG. 2.

The processing of the step S1 and S2 is identical to that of the routine of FIG. 2.

When the vehicle speed is equal to or higher than the reference vehicle speed, the CPU 1 outputs a signal commanding display of the vehicle speed on the meter 6, to the display control unit 7 in a step S13.

When the vehicle speed is lower than the reference vehicle speed, the CPU 1 outputs a signal commanding display of the steering angle of the steered wheels on the meter 6, to the display control unit 7 in a step S14.

In a step S15, the display control unit 7 causes the meter 6 to display the data designated by the signal from the CPU 1. Although the processing of the step S15 is a process performed by the display control unit 7 rather than a process performed by the CPU 1, the step S15 is included in the FIG. 2 as a part of the display switching routine for convenience of explanation.

According to this embodiment also, the space for the display device can be minimized without affecting the operation efficiency of the fork-lift truck as in the case of the first embodiment.

As described hereintofore, this invention causes the meter 6 to selectively display the vehicle speed and the steering angle of the steered wheels, thereby minimizing the space for the display device in a narrow operating deck of the fork-lift truck without affecting the operation efficiency of the fork-lift truck. When this invention is applied to a fork-lift truck of rear-wheel-steering type, the operator is able to view the display of the steering angle when necessary, and therefore specifically favorable effect is obtained.

The contents of Tokugan 2005-123679, with a filing date of Feb. 16, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiments described above, this invention is applied to a fork-lift truck, but this invention can be applied in general to any industrial vehicle which is provided with a steered wheel.

The embodiments of this invention in which an exclusive property or privilege is claimed are defined as follows:

What is claimed is:

1. A vehicle information display device for use with an industrial vehicle having a steered wheel, comprising:
   a vehicle speed sensor configured to detect a vehicle speed;
   a steering angle sensor configured to detect a steering angle of the steered wheel;
   a meter which can selectively display the vehicle speed and the steering angle of the steered wheel; and
   a programmable controller programmed to:
      cause the meter to display the steering angle of the steered wheel when the vehicle speed is lower than a predetermined reference vehicle speed while the vehicle is running; and
      cause the meter to display the vehicle speed when the vehicle speed is not lower than the predetermined reference vehicle speed.

2. The vehicle information display device as defined in claim 1, wherein the predetermined reference vehicle speed corresponds to a vehicle speed below which monitoring of the steering angle of the steered wheel is required to predict which path the vehicle will take.

3. The vehicle information display device as defined in claim 2, wherein the industrial vehicle is a fork-lift truck and a vehicle speed region which is lower than the predetermined reference vehicle speed includes a vehicle speed at which the fork-lift is about to stop after starting and a vehicle speed at which the fork-lift truck is switching between forward running and reverse running.

4. The vehicle information display device as defined in claim 3, wherein the fork-lift truck is of a rear-wheel-steering type.

5. A vehicle information display device for use with an industrial vehicle having a steered wheel, comprising:
- means for detecting a vehicle speed;
- means for detecting a steering angle of the steered wheel;
- meter means for selectively displaying the vehicle speed and the steering angle of the steered wheel;
- means for causing the meter means to display the steering angle of the steered wheel when the vehicle speed is lower than a predetermined reference vehicle speed while the vehicle is running; and
- means for causing the meter means to display the vehicle speed when the vehicle speed is not lower than the predetermined reference vehicle speed.

6. A vehicle information display method for an industrial vehicle having a steered wheel and a meter which can selectively display a vehicle speed and a steering angle of the steered wheel, the method comprising:
- detecting the vehicle speed;
- detecting the steering angle of the steered wheel;
- causing the meter to display the steering angle of the steered wheel when the vehicle speed is lower than a predetermined reference vehicle speed while the vehicle is running; and
- causing the meter to display the vehicle speed when the vehicle speed is not lower than the predetermined reference vehicle speed.

7. The vehicle information display device as defined in claim 1, wherein the predetermined reference vehicle speed is set to be 3 km/hr.

8. The vehicle information display device as defined in claim 1, wherein the industrial vehicle comprises at least two steered wheels.

* * * * *